United States Patent
Dale et al.

(10) Patent No.: US 7,159,095 B2
(45) Date of Patent: Jan. 2, 2007

(54) METHOD OF EFFICIENTLY HANDLING MULTIPLE PAGE SIZES IN AN EFFECTIVE TO REAL ADDRESS TRANSLATION (ERAT) TABLE

(75) Inventors: Jason Nathaniel Dale, Austin, TX (US); Jonathan James DeMent, Austin, TX (US); Kimberly Marie Fernsler, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 10/730,953

(22) Filed: Dec. 9, 2003

(65) Prior Publication Data
US 2005/0125623 A1   Jun. 9, 2005

(51) Int. Cl.
G06F 12/00 (2006.01)
G06F 12/10 (2006.01)

(52) U.S. Cl. .................. 711/200; 711/206; 711/208

(58) Field of Classification Search .................. None
See application file for complete search history.

(56) References Cited

U.S. PATENT DOCUMENTS

| | | | |
|---|---|---|---|
| 5,319,760 A * | 6/1994 | Mason et al. ............... 711/208 |
| 5,835,963 A * | 11/1998 | Yoshioka et al. ........... 711/207 |
| 6,078,987 A * | 6/2000 | Kongetira ................... 711/108 |
| 6,625,715 B1 * | 9/2003 | Mathews .................... 711/207 |
| 6,647,482 B1 * | 11/2003 | Ronen et al. ............... 711/212 |
| 2002/0133685 A1 * | 9/2002 | Kalyanasundharam ...... 711/207 |
| 2002/0156962 A1 * | 10/2002 | Chopra et al. ................. 711/3 |
| 2003/0204702 A1 * | 10/2003 | Lomax et al. ............. 711/207 |
| 2005/0027961 A1 * | 2/2005 | Zhang ........................ 711/207 |

* cited by examiner

*Primary Examiner*—Matthew Kim
*Assistant Examiner*—Michael Krofcheck
(74) *Attorney, Agent, or Firm*—Carr LLP; Diana R. Gerhardt

(57) ABSTRACT

A method and apparatus for efficiently storing an effective address (EA) in an effective to real address translation (ERAT) table supporting multiple page sizes by adding PSI fields, based on the number of unique page sizes supported, to each ERAT entry and using one ERAT entry to store an EA for a memory page, regardless of page size, by setting the PSI fields to indicate the page size.

4 Claims, 3 Drawing Sheets

METHOD OF EFFICIENTLY HANDLING MULTIPLE PAGE SIZES IN AN EFFECTIVE TO REAL ADDRESS TRANSLATION (ERAT) TABLE

FIELD OF THE INVENTION

The invention relates generally to memory addressing and, more particularly, to effective to real address translation (ERAT).

BACKGROUND OF THE INVENTION

Modern computer architectures typically provide a mechanism, such as an effective to real address translation (ERAT) table, for converting an effective address (EA), used by an application, to a real address (RA), which is used for referencing memory. In order for applications to be able to execute quickly, it is important that the EA to RA translation be done as efficiently as possible.

The ERAT table is usually based on a specific page size, known as the base page size. In conventional systems, the use of page sizes larger than the base page typically results in multiple entries in the ERAT table for the same page. For example, if the base page size is 4 kilobytes (KB), an entry for a 4 KB page would use one ERAT entry, an 8 KB page would use two entries and a 16 KB page would use four entries in the ERAT table.

It is possible for very large page sizes, such as 16 megabytes (MB) or greater, for one page to use up all entries in the ERAT. This is very wasteful of ERAT entries, and can result in slower performance when an address on a page that is not in the ERAT table is accessed, resulting in the EA being sent to a higher level of address translation, which usually takes significantly longer than an ERAT lookup.

Therefore, there is a need for a more efficient method of handling multiple page sizes when using an ERAT table.

SUMMARY OF THE INVENTION

The present invention provides a method and apparatus for efficiently storing an effective address (EA) in an effective to real address translation (ERAT) table supporting multiple page sizes, by adding page size indicator fields, based on the number of unique page sizes supported, to each ERAT entry and using one ERAT entry to store an EA for a memory page, regardless of the page size, by setting the page size indicators to indicate the page size.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention can be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU, regardless of whether the MPU is the sole computational element in the device or whether the MPU is sharing the computational load with other MPUs.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
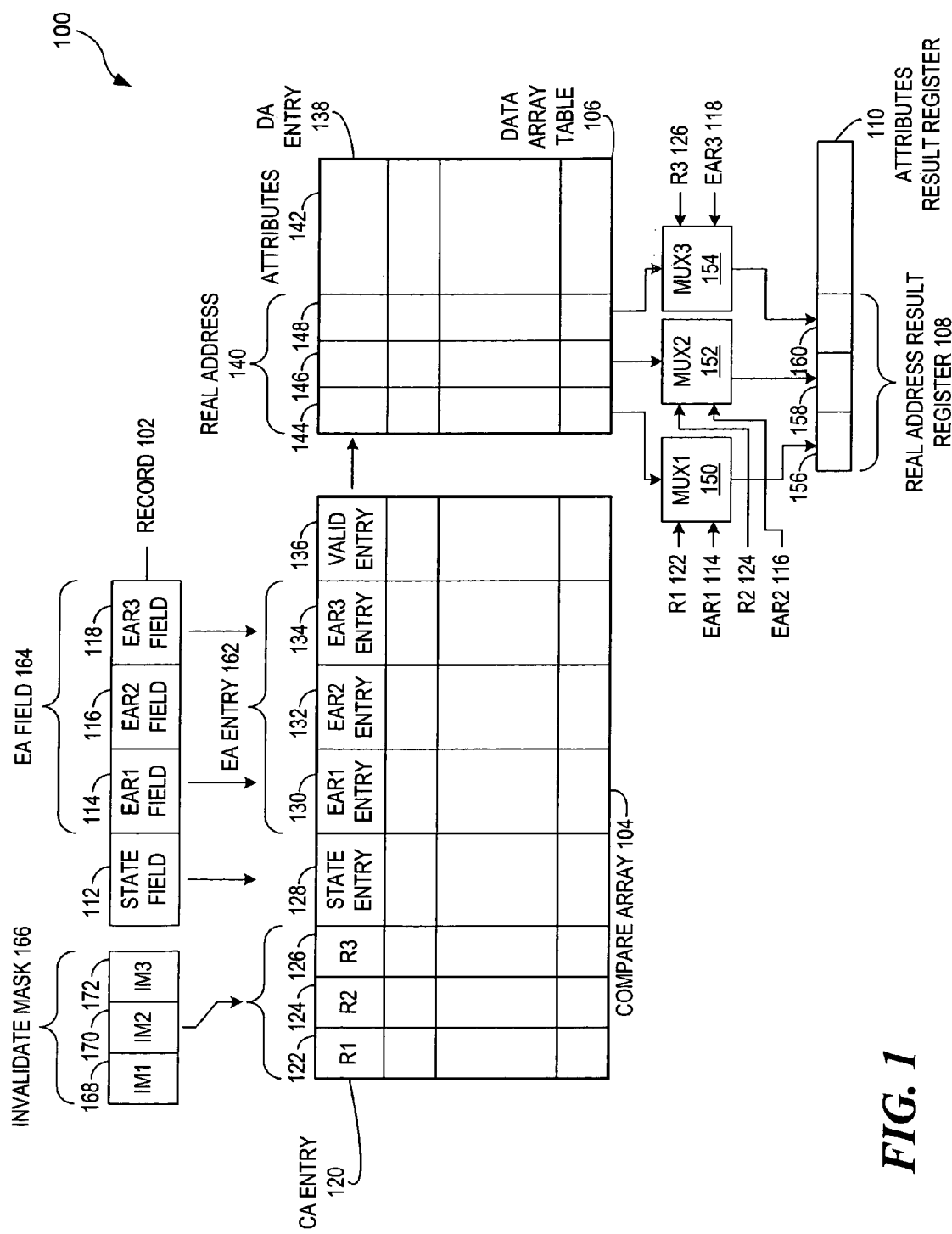
FIG. 1 is a block diagram of an effective address (EA) to real address (RA) translation, using an ERAT table supporting three page sizes.

Referring to FIG. 1, the reference numeral 100 generally designates a block diagram of how an effective address (EA) is translated to a real address (RA), using an effective to real address translation (ERAT) table supporting three page sizes.

FIG. 1 shows a record 102, a compare array (CA) 104, a data array (DA) table 106, an RA result register 108, and an attributes result register 110. Record 102 comprises a state field 112, an effective address range 1 (EAR1) field 114, an effective address range 2 (EAR2) field 116, and an effective address range 3 (EAR3) field 118.

Note that an ERAT table is functionally divided into a compare array portion and a data array portion.

Compare array 104 comprises multiple entries, including CA entry 120. CA entry 120 comprises page size indicators R1 122, R2 124 and R3 126, state entry 128, EAR1 entry 130, EAR2 entry 132, EAR3 entry 134, and valid indicator entry 136.

DA table 106 comprises multiple entries, including data array entry 138. Data array entry 138 comprises a Data Array Address (DAA) entry 140 and an attributes entry 142. DAA entry 140 comprises RA1 144, RA2 146, and RA3 148. In this example there are three address ranges so there are also three muxes; mux1 150, mux2 152, and mux3 154. Similarly, real address result register 108 is divided into three fields; result register real address 1 (RRRA1) 156, RRRA2 158, and RRRA3 160.

EAR1 entry 130, EAR2 entry 132 and EAR3 entry 134 of CA entry 120 are collectively called EA field 162. EAR1 field 114, EAR2 field 116 and EAR3 field 118 of record 102 are collectively called EA field 164. An invalidate mask 166, comprises three fields, IM1 168, IM2 170, and IM3 172.

In conventional systems, when the record 102 is presented for translating the EA to an RA, the EA field 164 in the record 102 is compared to the EA entry 162 for each CA entry 120 in CA 104 to see if there is a match. If there is a match, and the rest of the information associated with the EA in CA entry 120, such as the state bits and the valid bit, indicate CA entry 120 is valid for EA field 166, then a "hit"

is said to occur, a lookup is done in a DA table 106, and the resulting Data Array address (DAA) 140 and attributes 142 are output to an RA result register 108 and an attributes result register 110.

In order to support one entry in the CA 104 for a page, regardless of the page size, a page size indicator is defined for each page size supported. In FIG. 1, three page size indicators, R1 122, R2 124 and R3 126 are defined for representing three page sizes. In this example, a bit is used as the page size indicator, however, any indicator such as a nibble, byte, word, etc. can be used as the indicator. Table 1 shows the possible combinations and meaning for each combination of the three page size indicators R1 122, R2 124, and R3 126.

TABLE 1

| R1 122 | R2 124 | R3 126 | Meaning |
|---|---|---|---|
| 0 | 0 | 0 | Small page size - match all three ranges (0, 1 & 2). |
| 0 | 0 | 1 | Medium page size - match range 1 and 2. |
| 0 | 1 | 1 | Large page size - match range 1. |
| 1 | 1 | 1 | No translation needed (EA = RA). |

Note:
All other bit combinations are invalid.

In FIG. 1, when the record 102 is presented for lookup in the CA 104, the EA field 164 and the EA entry 162 in each CA entry 120 are divided into ranges based on how many different page sizes are supported, and the ranges are compared for each entry in the CA 104. Once each range in the EA field 164 and each range in the EA entry 162 have been compared, the page size indicators R1 122, R2 124, R3 126 are checked to see which ranges need to match for a "hit" to occur.

In this example three page sizes are supported, so the EA field 164 of record 102 is divided into three ranges, EAR1 field 114, EAR2 field 116, and EAR3 field 118. Similarly, EA entry 162 of CA entry 120 is divided into three ranges, EAR1 entry 130, EAR2 entry 132, and EAR3 entry 134.

Thus, if the record 102 is for a small page size, which is usually the base page size for the CA 104, all three ranges should match for a "hit", i.e. EAR1 field 114 should match EAR1 entry 130, EAR2 field 116 should match EAR2 entry 132 and EAR3 field 118 should match EAR3 entry 134. A "match" is defined as binary equivalence between two fields.

If the record 102 is for a medium page size, then the first two ranges should match for a "hit," i.e., EAR1 field 114 should match EAR1 entry 130 and EAR2 field 116 should match EAR2 entry 132. Whether EAR3 field 118 matches EAR3 entry 134 is not relevant in determining whether a "hit" occurred.

If the record 102 is for a large page size, then EAR1 field 114 should match EAR1 entry 130, and whether the other two ranges match or not is not relevant in determining whether a "hit" occurred. Whether EAR2 field 116 matches EAR2 entry 132 and whether EAR3 field 118 matches EAR3 entry 134 is not relevant in determining whether a "hit" occurred.

Note that because the CA 104 is typically stored in content addressable memory (CAM), record 102 is compared simultaneously to all entries in CA 104. This means that, simultaneously, all the fields in record 102, i.e., state 112, EAR1 114, EAR2 116 and EAR3 118, are compared with state entry 128, EAR1 entry 130, EAR2 entry 132, and EAR3 entry 134, respectively. Then, the page size indicators R1 122, R2 124 and R3 126 are examined, and the valid indicator entry 136 is checked to see if it is set to valid. A "hit" occurs when state field 112 has the same value as state entry 128, valid indicator entry 136 is set to valid and, based on the page size indicators R1 122, R2 124 and R3 126, the appropriate fields EAR1 114, EAR2 116 and EAR3 118 match EAR1 entry 130, EAR2 entry 132, and EAR3 entry 134, respectively, as shown in Table 1.

Once a "hit" occurs, then DAA 140 and its attributes 142 are looked up in the DA table 106. Based on the page size of EA entry 162, not all of the DAA bits from data array entry 138 are used, since as the page size increases, more of the DAA bits are equal to EA field 164. For example, for large page sizes, the lower bits of EA entry 162 and EA field 164 can differ, and so these lower bits need not match for a "hit" to occur. Therefore, mux1 150, mux2 152, and mux3 154, are placed outside of DA table 106. The number of muxes used depends on how many page sizes are supported by CA 104.

Each mux has as three inputs; (i) a range from EA field 164, (ii) a range from DAA 140, and (iii) the appropriate range indicator. Each mux uses the range indicator input as a mux selector. Thus, mux1 has inputs EAR1 field 114, RA1 144, and page size indicator R1 122, mux2 has inputs EAR2 field 116, RA2 146, and page size indicator R2 124, and mux3 has inputs EAR3 field 118, RA3 148, and page size indicator R3 126. The page size indicators are used by the muxes as mux selectors to determine which ranges from EA field 164 and which ranges from DAA 140 are output to RA result register 108. This is described in more detail below.

If the compare is for a small page size, all three ranges of EA field 164 should match EA entry 162 for a hit and thus the entire EA field 164 is translated. When a "hit" occurs, a lookup is done in DA table 106, and the associated DAA 140 and its attributes 142 are found. The purpose of mux1, mux2, and mux3 is to multiplex the corresponding ranges of EA field 164 and DAA 140 using the page size indicators R1 122, R2 124, and R3 126. For a small page size, all three ranges of EA field 164 need to be translated so the entire DAA 140 that comes out of DA table 106 is output to RA result register 108. That is, RA1 144, RA2 146 and RA3 148 will be output to RRRA1 156, RRRA2 158 and RRRA3 160, respectively, of RA result register 108.

If the compare is for a medium page size, then only ranges 1 and 2 need to match for a "hit", and range 3 of EA field 164, EAR3 field 118, does not need to be translated. When a "hit" occurs, DAA 140 and its attributes 142 are looked up in DA table 106. The page size indicators are used to select the corresponding ranges of EA field 164 and DAA 140. For a medium page size, range 1 and 2 of EA field 164 need to be translated, so the mux selectors, page size indicators R1 and R2 respectively, will choose ranges RA1 144 and RA2 146 from DA entry 138. Since range 3 of EA field 164 does not need to be translated for a medium page size, the mux selector page size indicator R3 126 will choose range EAR3 field 118. Thus for a medium page size, the three ranges, RA1 144, RA2 146 and EAR3 field 118 are output to RRRA1 156, RRRA2 158, and RRRA3 160, respectively, in RA result register 108.

If the compare is for a large page size, then only range 1 should match for a "hit". Thus EAR2 field 116 and EAR3 field 118 do not need to be translated. When a "hit" occurs, DAA 140 and its attributes 142 are looked up in DA table 106. Since for a large page size only EAR1 field 114 needs to be translated, in mux1 150, page size indicator R1 122, will choose RA1 144. However, EAR2 field 116 and EAR3 field 118 do not need to be translated, so the mux selectors on ranges 2 and 3, page size indicators R2 124 and R3 126, respectively, will choose EAR2 field 116 and EAR3 field 118. Thus for a large page size, the three ranges, RA1 144, EAR2 116 and EAR3 118 are output to RRRA1 156, RRRA2 158, and RRRA3 160, respectively, in RA result register 108.

If EA to RA translation is not required, i.e., R1 entry 122, R2 entry 124 and R3 entry 126 are each set to 1, as indicated in Table 1, then none of the address ranges are required to match, though the state bits should still match. Since none of the three ranges EAR1 field 114, EAR2 field 116 and EAR3 field 118 need to be translated to an RA, the mux selectors, page size indicators R1 122, R2 124, and R3 126 will choose EAR1 field 114, EAR2 field 116 and EAR3 field 118, respectively. Thus if EA field 164 does not require address translation, EAR1 114, EAR2 116 and EAR3 118 are output to RRRA1 156, RRRA2 158, and RRRA3 160, respectively, in RA result register 108, and none of the ranges of DAA 140 from DA table 106 are used.

Note that an advantage of FIG. 1 is that all addresses that do not require translation and that have the same state bits will share the same entry in the ERAT. Thus very few ERAT entries will be used up by addresses that do not require translation.

The information on the mux output to RA result register 108 is summarized in Table 2.

TABLE 2

| Page Size | Content of RRRA1 156 | Content of RRA2 158 | Content of RRRA3 160 |
|---|---|---|---|
| Small | RA1 144 | RA2 146 | RA3 148 |
| Medium | RA1 144 | RA2 146 | EAR3 118 |
| Large | RA1 144 | EAR2 116 | EAR3 118 |
| EA = RA (no translation) | EAR1 114 | EAR2 116 | EAR3 118 |

When an CA entry 120 must be invalidated, a lookup is done on the record, that is, an implementation dependant subset of EA field 164 is compared to the appropriate subset of EA entry 162 for each CA entry 120, the page size indicator fields R1 122, R2 124 and R3 126 are compared with the invalid mask indicators IM1 168, IM2 170 and IM3 172 supplied with the invalidate comand and, if there is a match, the valid indicator entry 136 for the CA entry 120 is set to indicate the entry is no longer valid. Note that for reasons beyond the scope of this description, the page size is known when performing an invalidate command, unlike when performing an ERAT table lookup.

In conventional systems, an invalidate for a page size larger than the base page size requires that all entries in the CA 104 be invalidated since no information on the page size is stored in the CA 104. This is very time consuming because the entire CA 104 must then be re-populated, with each CA entry 120 requiring a lengthy call to a secondary translation to convert an EA into an RA.

For example, implementing the CA 104 using content addressable memory typically results in an EA to RA lookup taking two cycles, while using secondary translation for an EA to RA conversion typically takes twenty cycles. If the CA 104 has thirty-two entries, then an invalidate for a page size larger than the base page size would result in re-populating the entire CA 104, which would take considerably longer in conventional systems, since using the method of FIG. 1 only the entries matching the invalidate criteria would be invalidated.

Using the method of FIG. 1 the ERAT table is able to cover more memory area. For example, in a system with a 4 KB base page size, and a largest page size of 16 MB, the method of FIG. 1 allows a 32-entry ERAT table to cover 512 MB (32×16 MB) of memory, whereas in conventional systems, a 32-entry ERAT table would cover only 128 KB (32×4 KB). Being able to cover a much larger portion of memory, 512 MB instead of 128 KB, results in the average memory access time being significantly faster, since most memory accesses can be fulfilled with an ERAT table lookup, instead of having to resort to a much lengthier secondary translation lookup.

The performance hit of invalidating all ERAT entries and re-populating the CA 104 is avoided because the page size can be determined by examining the page size indicator fields R1 122, R2 124, and R3 126.

When a new CA entry 120 is written, the page size for the page referenced by the record 102 is known, so the appropriate page size indicator fields, R1 122, R2 124 and R3 126, in the CA entry 120 are set, the contents of EAR1 entry 130, EAR2 entry 132 and EAR3 entry 134 are set to the value of EAR1 field 114, EAR2 field 116 and EAR3 field 118, respectively, the state entry 128 is set to the contents of the state field 112, and the valid indicator entry 136 is set to valid. Additionally, the real address and attributes associated with CA entry 120 are written to DAA 140 and attributes 142 of DA entry 138 of DA table 106.

When a new CA entry 120 is written, typically an invalid CA entry 120 in the CA 104 where the valid indicator entry 136 is set to invalid, is used. If all the entries in the CA 104 are valid, then a method well known in the art, such as least recently used (LRU), can be used to choose an CA entry 120 to overwrite.

In FIG. 1, three page sizes, small (base), medium and large, are supported and therefore three page size indicators, R1 122, R2 124, and R3 126, are defined. The method of FIG. 1 can be used to support multiple page sizes by defining a page size indicator for each supported, unique, page size. Thus, if there are n page sizes supported, then n page size indicator fields should be defined for each CA entry 120 in the CA 104. For example, if four pages are supported, then four page size indicators are defined, if five page sizes are supported, then five page size indicators are defined, and so on.

Figure 2:
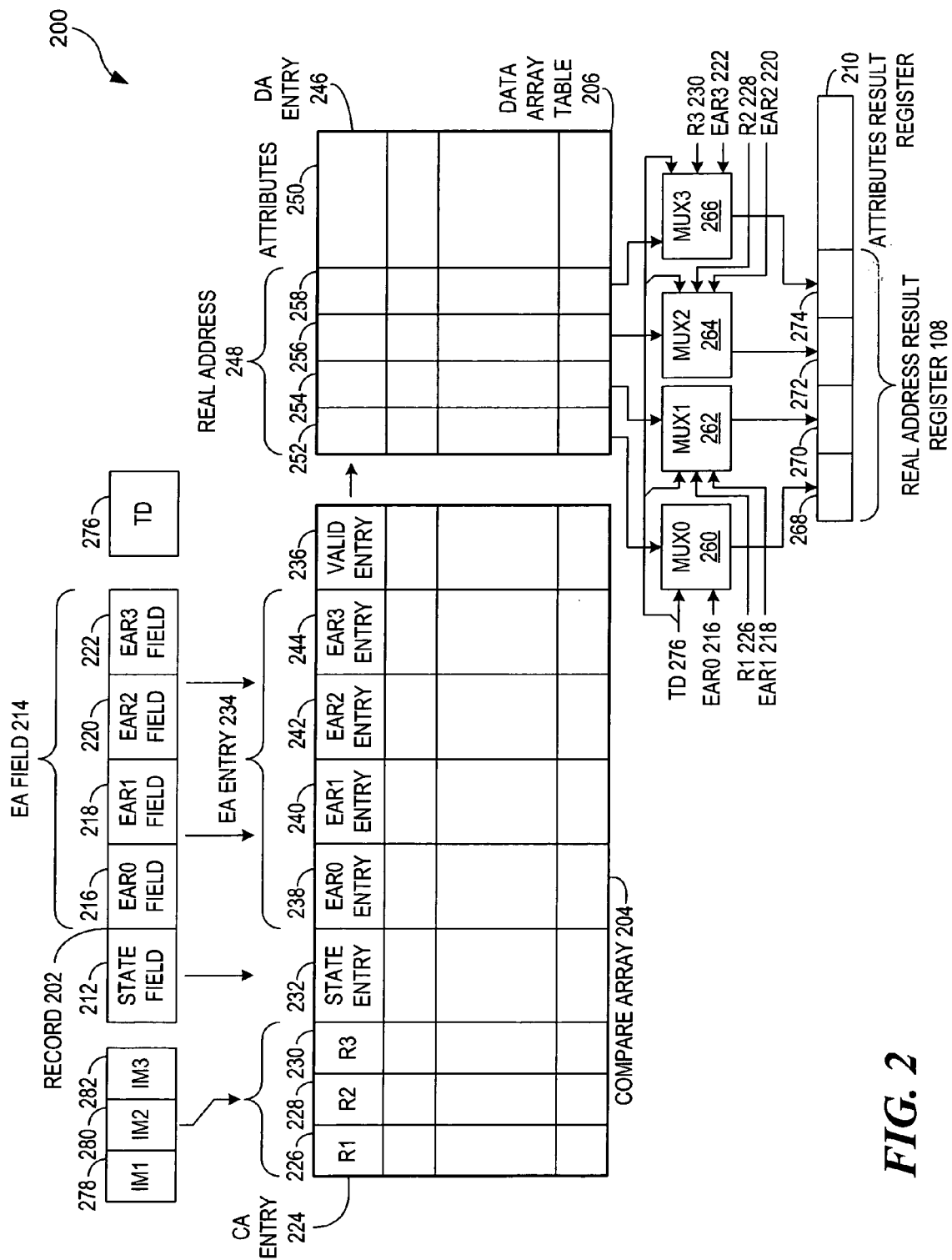
FIG. 2 is a block diagram of an EA to RA translation, using an ERAT table supporting four page sizes.

Now referring to FIG. 2, the reference numeral 200 generally designates a block diagram of an EA to RA translation, using an ERAT table supporting four page sizes.

FIG. 2 comprises a record 202, a CA table 204, a data array table 206, an RA result register 208, and an attributes result register 210. Record 202 comprises a state field 212 and an EA field 214. EA field 214 comprises an EA range 0 (EAR0) field 216, EA range 1 (EAR1) field 218, EA range 2 (EAR2) field 220, and EA range 3 (EAR3) field 222.

Note that the ERAT table is functionally divided into a compare array portion and a data array portion.

CA table 204 comprises multiple entries, including CA entry 224. CA entry 224 comprises page size indicators R1 226, R2 228, and R3 230, state entry 232, EA entry 234, and valid indicator entry 236. EA entry 234 comprises EAR0 entry 238, EAR1 entry 240, EAR2 entry 242, and EAR3 entry 244.

Data array table 206 comprises multiple entries, including data array (DA) entry 246. DA entry 246 comprises a DAA entry 248 and an attributes entry 250. DAA entry 248 comprises RA0 252, RA1 254, RA2 256 and RA3 258.

There are four muxes, mux0 260, mux1 262, mux2 264, and mux3 266. The real address in result register 208 is divided into four ranges, RRRA0 268, RRRA1 270, RRRA2

272 and RRRA3 274. There is a translation-disabled indicator TD 276, and three invalidate mask indicators IM1 278, IM2 280 and IM3 282.

Another method of efficiently supporting multiple page sizes in an ERAT table can be achieved using page size indicators. In this, n page sizes are supported using n−1 page size indicators. In FIG. 2, four different page sizes, small (base), medium, large and extra large, are supported using only three page size indicators, R1 226, R2 228 and R3 230. Note that in this example a bit is used for each page size indicator, however, any indicator such as a nibble, byte, word, etc., can be used.

TABLE 3

| R0 | R1 226 | R2 228 | R3 230 | Meaning |
|---|---|---|---|---|
| 0 | 0 | 0 | 0 | Small (base) size - match all ranges (0, 1, 2, & 3) |
| 0 | 0 | 0 | 1 | Medium page size - match ranges 0, 1 and 2. |
| 0 | 0 | 1 | 1 | Large page size - match ranges 0 and 1. |
| 0 | 1 | 1 | 1 | Extra large page size - match range 0 |

Note:
All other bit combinations are invalid.

In FIG. 2, an EA field 214 is divided into four ranges, EAR0 field 216, EAR1 field 218, EAR2 field 220, and EAR3 field 222. In this example, a value of 0 is used to indicate which ranges should match for a "hit" to occur, as shown in Table 3.

Note, however, that R0 has the value of 0 for each entry in Table 3, and so the R0 column can be eliminated since R0 is a constant and therefore does not need to be stored in the ERAT table, resulting in Table 4. In FIG. 2, four page sizes can be represented using only three page size indicators, R1 226, R2 228 and R3 230, as shown in Table 4. This method is also extendable, so that n−1 page size indicators can be used for n unique page sizes.

TABLE 4

| R1 226 | R2 228 | R3 230 | Meaning |
|---|---|---|---|
| 0 | 0 | 0 | Small (base) size - match all ranges (0, 1, 2, & 3) |
| 0 | 0 | 1 | Medium page size - match ranges 0, 1 and 2. |
| 0 | 1 | 1 | Large page size - match ranges 0 and 1. |
| 1 | 1 | 1 | Extra large page size - match range 0 |

Note:
All other bit combinations are invalid.

Thus, if record 202, presented for lookup, references a small page size, typically the base page size used for the ERAT, then all four ranges should match for a "hit." In this example, EAR0 field 216 should match EAR0 entry 238, EAR1 field 218 should match EAR1 entry 240, EAR2 field 220 should match EAR2 entry 242, and EAR3 field 222 should match EAR3 entry 244 for a "hit" to occur.

If the record 202 references a medium page size, then the first three ranges need to match for a "hit." In this example, EAR0 field 216 should match EAR0 entry 238, EAR1 field 218 should match EAR1 entry 240 and EAR2 field 220 should match EAR2 entry 242. Whether EAR3 field 222 matches EAR3 entry 244 is not relevant in determining whether a "hit" occurred for a medium page size.

If the record 202 references a large page size, then EAR0 field 216 should match EAR0 entry 238 and EAR1 field 218 should match EAR1 entry 240. Whether the other two ranges, EAR2 field 220 and EAR3 field 222, should match EAR2 entry 242 and EAR3 entry 244, respectively, is not relevant in determining whether a "hit" occurred for a large page size, in this example.

If the record 202 is for an extra large page size, then EAR0 field 216 should match EAR0 entry 238 for a "hit" to occur. Whether EAR1 field 218, EAR2 field 220 and EAR3 field 222 match EAR1 entry 240, EAR2 entry 242, and EAR3 entry 244, respectively, is not relevant in determining whether a "hit" occurred for an extra large page size, in this example.

Note that because the CA table 204 is typically stored in content addressable memory (CAM), record 202 is compared simultaneously to all ERAT entries. This means that, simultaneously, all the fields, state 212, EAR0 216, EAR1 218, EAR2 220 and EAR3 222, in record 202 are compared with state entry 232, EAR0 entry 238, EAR1 entry 240, EAR2 entry 242, and EAR3 entry 244, respectively. Then the page size indicators R1 226, R2 228 and R3 230 are checked to see which ranges must match, and the valid indicator entry 236 is checked to see if it is set to valid. A "hit" occurs when state field 212 has the same value as state entry 232, valid indicator entry 236 is set to valid, and based on the page size indicators R1 226, R2 228, and R3 230; fields EAR0 216, EAR1 218, EAR2 220 and EAR3 222 match the appropriate EAR0 entry 238, EAR1 entry 240, EAR2 entry 242, and EAR3 entry 244, as shown in Table 4.

Once it has been determined that a "hit" has occurred, a valid indicator entry 236 is checked to make sure the ERAT entry 234 is valid. If there is a "hit" and the valid indicator entry 236 indicates that the ERAT entry 234 is valid, the DAA 248 and attributes 250 are looked up in a data array table 206. Based on the page size of CA entry 224, not all of the ranges of DAA 248 are used, since as the page size increases more of the DAA is equal to the EA.

Mux0 260 takes three inputs: (1) an EA range, EAR0 field 216; (2) a DAA range, RA0 252; and (3) a translation disabled indicator TD 276. However, mux1 262, mux2 264 and mux3 266 each take four inputs: (1) an EA range, EAR1 field 218, EAR2 field 220, and EAR3 field 222, respectively; (2) a DAA range, RA1 254, RA2 256, RA3 258, respectively; (3) a translation disabled indicator TD 276; and (4) page size indicators R1 226, R2 228 and R3 230. Mux0 uses TD 276 to determine what to output to RRRA0 268; if TD 276 indicates translation is enabled, mux0 260 selects RA0 252 to output to RRRA0 268; if TD 276 indicates translation is disabled, mux0 260 selects EAR0 216 to output to RRRA0 268. Mux1 262, mux2 264 and mux3 266 use (3) and (4) to determine which of (1) or (2) is output to RA result register 208 and attributes result register 210, respectively, similar to the previously discussed method.

An example using an EA field 214 that does not require address translation is as follows. Since none of the address ranges are required to match, the ranges RA0 252, RA1 254, RA2 256 and RA3 258 are equal to EAR0 field 216, EAR1 field 218, EAR2 field 220, and EAR3 field 222, respectively. When TD 276 is sent with record 202, it is not necessary to do a lookup in CA table 204, so EAR0 field 216, EAR1 field 218, EAR2 field 220, and EAR3 field 222 are output directly to RRRA0 268, RRRA1 270, RRRA2 272 and RRRA3 274.

Table 5 shows the output to RA result register 208 for different combinations of TD 276 and page size indicators R1 226, R2 228, and R3 230.

TABLE 5

| Combination of R1 226, R2 228, R3 230 and TD 276 | Output to RA Result Register 208 |
| --- | --- |
| If TD = 1 then output EAR0 field 216, else output RA0 252 | RRRA0 268 |
| If (TD = 1 or R1 = 1) then output EAR1 field 218, else output RA1 254 | RRRA1 270 |
| If (TD = 1 or R2 = 1) then output EAR2 field 220, else output RA2 256 | RRRA2 272 |
| If (TD = 1 or R3 = 1) then output EAR3 field 222, else output RA3 258 | RRRA3 274 |

Note that in FIG. 2, EAs that do not require translation are not stored in the ERAT. This is extremely efficient since it allows ERAT table entries to be used only for EAs that require translation to an RA. The only additional cost is that each mux has to check the translation-disabled indicator TD 276, in addition to checking the page size indicators.

When an ERAT entry 234 must be invalidated, a lookup is done on the record 202. In other words, EAR0 field 216, EAR1 field 218, EAR2 field 220 and EAR3 field 222, or some implementation dependent subset of EA field 214, are compared to the EAR0 entry 238, EAR1 entry 240, EAR2 entry 242 and EAR3 entry 244 for each ERAT entry 234, the invalidate mask indicators IM1 278, IM2 280, and IM3 282 are compared with the page size indicator fields R1 226, R2 228 and R3 230 and if they match, the valid indicator entry 236 for the ERAT entry 234 is set to indicate that the entry is no longer valid. As previously noted, the page size, supplied in the form of IM1 278, IM2 280, and IM3 282, is known when performing an invalidate command, unlike when performing a lookup in CA table 204.

When a new ERAT entry 234 is written, the page size for the page referenced by the record 202 is known, so the appropriate page size indicator fields, R1 226, R2 228 and R3 230, in the ERAT entry 234 are set, the contents of EAR0 entry 238, EAR1 entry 240, EAR2 entry 242 and EAR3 entry 244 are set to the value of EAR0 field 216, EAR1 field 218, EAR2 field 220 and EAR3 field 222, respectively, the state entry 232 is set to the contents of the state field 212, and the valid indicator entry 236 is set to valid. In addition, the DAA 248 and its associated attributes 250, such as access information, whether it can be cached or not etc., are written to DA entry 246 of DA table 206.

When a new ERAT entry 234 is written, typically, an invalid ERAT entry 234 in the CA table 204 where the valid indicator entry 236 is set to invalid, is overwritten with the new entry. If all the entries in the CA table 204 are valid, then a method well known in the art, such as least recently used (LRU), can be used to choose an ERAT entry 234 to overwrite.

Figure 3:
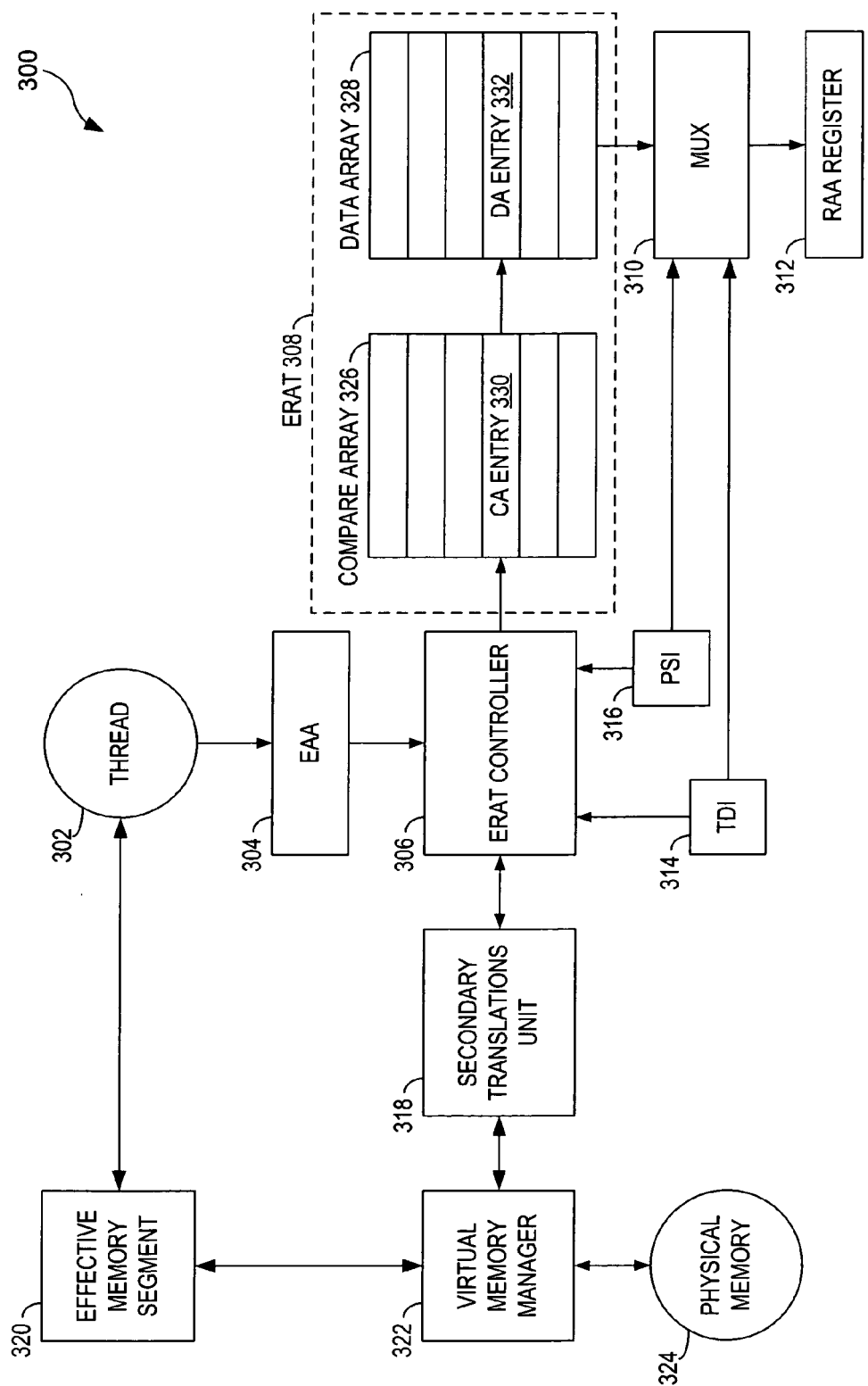
FIG. 3 is a block diagram of a system overview.

Now referring to FIG. 3, the reference numeral 300 generally designates a block diagram of a system view. FIG. 3 describes a system which the methods described in FIG. 1 and FIG. 2 use to efficiently store effective addresses with different page sizes in an ERAT table.

FIG. 3 comprises a thread 302, an EA and attributes record (EAAR) 304, an ERAT controller 306, an ERAT table 308, a mux 310, an RA and attributes register (RAAR) 312, a translation disabled indicator (TDI) 314, a set of page size indicators (PSI) 316, a secondary translations unit (STU) 318, an effective memory segment (EMS) 320, a virtual memory manager (VMM) 322 and physical memory 324. ERAT table 308 comprises a compare array (CA) 326 and a data array (DA) 328. CA 318 comprises multiple entries, including EA entry 330. DA 320 comprises multiple entries, including DA entry 332. Note that TDI 314 is present only if the method described in FIG. 2 is used.

ERAT controller 306 performs various functions to ERAT table 308, including using ERAT table 308 to translate an EA to an RA, writing a new entry to ERAT table 308, and invalidating entries in ERAT table 308.

Thread 302 is allocated an effective memory segment 320. When it needs to translate the EA to an RA, thread 302 presents EAA 304 to the ERAT controller 306 for translation. The RA refers to the actual address in physical memory 324.

As previously discussed in FIG. 1, PSI 316 is used to indicate EAAR 304 is translation disabled if n page size indicators are used for n page sizes. When n page size indicators are used, one entry in CA 326 and one entry in DA 328 is used to store a translation disabled EA.

As previously discussed in FIG. 2, TDI 314 is used to indicate EAAR 304 is translation disabled if n−1 page size indicators are used for n page sizes. When n−1 page size indicators are used, translation disabled EAs are not stored in ERAT 308.

ERAT controller 306 uses PSI 316 to determine how many ranges to divide EAAR 304 and CA entry 330 into, and which ranges need to match when comparing EAAR 304 to CA entry 330. Muxes 310 use PSI 316 to determine which ranges from EAAR 304 and which ranges from DA entry 332 are used to create RA 312.

If EAA 304 does not have an entry in CA 330, ERAT controller 306 requests the RA from STU 318 and then stores EAA 304 in ERAT 308. STU 318 requests VMM 322 to find the RA in physical memory 324.

It will be understood from the foregoing description that various modifications and changes may be made, in the preferred embodiment of the present invention, without departing from its true spirit. This description is intended for purposes of illustration only and should not be construed in a limiting sense. The scope of this invention should be limited only by the language of the following claims.

The invention claimed is:

1. A method of storing an effective address (EA) in an effective to real address translation (ERAT) table supporting multiple page sizes including a base page size, wherein the ERAT table comprises a plurality of entries, the method comprising the steps of:

adding a plurality of page size indicator (PSI) fields to each entry of the ERAT table, wherein a PSI field is added for each unique page size, including the base page size, wherein the PSI fields of each entry are used to store values that collectively specify either: (i) one of the supported page sizes, or (ii) that an effective address stored in the same entry of the ERAT table does not need translation, and wherein at least one combination of the values of the PSI fields of each entry specifies that the effective address stored in the same entry does not need translation;

storing the EA in one of the entries of the ERAT table; and setting the values of the PSI fields of the one of the entries of the ERAT table to specify either: (i) a page size of the EA, wherein the page size of the EA is one of the supported page sizes, or (ii) that the EA does not need translation.

2. A method of storing an effective address (EA) in an effective to real address translation (ERAT) table supporting multiple page sizes including a base page size and at least one other page size that is a multiple of 2 times the base page size and wherein the ERAT table comprises a plurality of entries, the method comprising the steps of:

adding a plurality of page size indicator (PSI) fields to each entry of the ERAT table, wherein the PSI fields of each entry are used to store values that collectively specify either: (i) one of the supported page sizes, or (ii) that an effective address stored in the same entry of the ERAT table does not need translation, and wherein at least one combination of the values of the PSI fields of each entry specifies that the effective address stored in the same entry does not need translation;

storing the EA in one of the entries of the ERAT table; and setting the values of the PSI fields of the one of the entries of the ERAT table to specify either: (i) a page size of the EA, wherein the page size of the EA is one of the supported page sizes, or (ii) that the EA does not need translation, wherein each entry of the ERAT table is also configured to store a plurality of state bits, and wherein all effective addresses that do not require translation and have the same state bits and share the same entry of the ERAT table.

3. A method of storing an effective address (EA) in an effective to real address translation (ERAT) table supporting multiple page sizes including a base page size, wherein the ERAT table comprises a plurality of entries, the method comprising the steps of:

adding a plurality of page size indicator (PSI) fields to each entry of the ERAT table, wherein the PSI fields of each entry are used to store values that collectively specify either: (i) one of the supported page sizes, or (ii) that an effective address stored in the same entry of the ERAT table does not need translation, and wherein at least one combination of the values of the PSI fields of each entry specifies that the effective address stored in the same entry does not need translation;

storing the EA in one of the entries of the ERAT table; and setting the values of the PSI fields of the one of the entries of the ERAT table to specify either: (i) a page size of the EA, wherein the page size of the EA is one of the supported page sizes, or (ii) that the EA does not need translation, wherein (m+1) PSI fields are added to each entry of the ERAT table, and wherein m is an integer, and wherein m of the (m+1) PSI fields are used to store values that collectively specify one of the supported page sizes, and wherein the remaining one of the (m+1) PSI fields is used to store a value that specifies whether an effective address stored in the same entry needs translation.

4. The method of claim 3, wherein each of the (m+1) PSI fields added to each entry of the ERAT table is configured to store one binary digit.

* * * * *